(12) United States Patent
Bakeev et al.

(10) Patent No.: US 6,432,355 B1
(45) Date of Patent: Aug. 13, 2002

(54) CORROSION INHIBITION DURING TRANSPORT OF WATER AND A HYDROCARBON THROUGH A PIPELINE

(75) Inventors: Kirill N. Bakeev, Ringwood; Jui-Chang Chuang, Wayne; Thomas Winkler, Maywood; Michael A. Drzewinski; David E. Graham, both of Long Valley, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/416,307

(22) Filed: Oct. 12, 1999

Related U.S. Application Data

(63) Continuation-in-part of application No. 09/415,657, filed on Oct. 12, 1999, now Pat. No. 6,281,274.

(51) Int. Cl.⁷ ............................ C23F 11/14; C23F 11/12
(52) U.S. Cl. ............................ 422/9; 585/950; 252/394; 252/396
(58) Field of Search ........................ 422/9, 16; 585/950; 137/3, 13; 252/394, 396

(56) References Cited

U.S. PATENT DOCUMENTS 4,711,726 A * 12/1987 Pierce et al. .............. 422/16 X
6,281,274 B1 * 8/2001 Bakeev et al.

* cited by examiner

*Primary Examiner*—Elizabeth McKane
(74) *Attorney, Agent, or Firm*—Walter Katz; William J. Davis; Marilyn J. Maue

(57) ABSTRACT

Described herein is a process of corrosion inhibition of a steel pipeline during transport of water and gas, or water and an oil, or mixtures thereof, therethrough, including introducing a copolymer of vinyl caprolactam and vinylpyridine into said pipeline.

14 Claims, No Drawings

CORROSION INHIBITION DURING TRANSPORT OF WATER AND A HYDROCARBON THROUGH A PIPELINE

CROSS-REFERENCE TO RELATED U.S. PATENT APPLICATIONS

This application is a continuation-in-part of U.S. patent application, Ser. No. 09/415,657, filed Oct. 12, 1999, by the same inventors and assigned to the same assignee as herein, and now U.S. Pat. No. 6,281,274.

BACKGROUND OF THE INVENTION

1. Field of the Invention

This invention relates to corrosion inhibition, and, more particularly, to a process of corrosion inhibition of a steel pipeline during transport of water and gas, or water and oil, or mixtures thereof, therethrough.

2. Description of the Prior Art

U.S. Pat. No. 4,174,370 described the use of certain pyridine compounds for inhibiting the corrosion of metals, particularly the prevention of corrosion of pipe which is on contact with a corrosive oil-containing medium, as, for example, in oil wells producing corrosive oil or oil-brine mixtures.

U.S. Pat. No. 5,723,524 describes compositions for retarding the formation of gas hydrates in a gas/water system.

Accordingly, it is an object of this invention to provide a new and improved corrosion inhibitor, particularly for use in pipelines carrying a gas and liquid, such as natural gas and water.

Another object herein is to provide a corrosion inhibitor composition having dual functionalities as both a corrosion inhibitor and as a gas hydrate inhibitor in natural gas-containing wells.

These and other objects and features of the invention will be made apparent from the following.

SUMMARY OF THE INVENTION

What is described herein is a single phase composition for effectively inhibiting the corrosion of pipeline conduits, and for preventing or retarding the formation or agglomeration of gas hydrates, during the transport of a fluid comprising water and a hydrocarbon, through the conduit. The composition comprises a copolymer of (a) vinyl caprolactam and (b) vinyl pyridine; optionally, a terpolymer with vinyl pyrrolidone, preferably wherein the vinyl pyridine is the 2- or 4-vinyl pyridine, optionally quaternized, e.g. with a $C_1$–$C_{18}$ alkyl halide, e.g. the iodide, bromide, chloride or fluoride; having a cloud point of >10° C., preferably >15° C.

Most preferably, the composition is made in a polymerization solvent which is a glycol ether, containing an alkoxy group having at least 3 carbon atoms, and most preferably, which is 2-butoxyethanol (BGE); and includes also a carrier solvent different from the polymerization solvent, preferably, monoethylene glycol (MEG).

In a preferred embodiment of the invention, the vinyl caprolactam monomer comprises about 70–97% of the polymer, and has a molecular weight of about 500 to 2500.

DETAILED DESCRIPTION OF THE INVENTION

Corrosion Inhibition

This function of this invention relates to the use of the copolymer in inhibiting the corrosion of metals, most particularly iron, steel and ferrous alloys. These copolymer compounds can be used in a wide variety of applications and systems where iron, steel and ferrous alloys are affected by corrosion. They may be employed for inhibiting corrosion in processes which require a protective or passivating coating as by dissolution in the medium which comes in contact with the metal. They can be used in preventing atmospheric corrosion, underwater corrosion, corrosion in steam and hot water systems, corrosion in chemical industries, underground corrosion, etc.

The corrosion inhibitors contemplated herein find special utility in the prevention of corrosion of pipe or equipment which is on contact with a corrosive oil-containing medium, as, for example, in oil wells producing corosive oil or oil-brine mixtures, in refineries, and the like. These inhibitors may, however, be used in other systems or applications. They appear to possess properties which impart to metals resistance to attack by a variety of corrosive agents, such as brines, weak inorganic acids, organic acids, $CO_2$, $H_2S$, air or oxygen, etc.

The present process finds particular utility in the protection of metal equipment of oil and gas wells, especially those containing or producing an acidic constituent such as $H_2S$, $CO_2$, air or oxygen, organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all wellhead fittings, connections and flow lines handling the corrosive fluid.

Where the inhibitor composition is a liquid, it is conventionally fed into the well annalus by means of a motor driven chemical injector pump, or it may be dumped periodically (e.g., once every day or two) into the annulus by means of a so-called "boll weevil" device or similar arrangement. Where the inhibitor is a solid, it may be dropped into the well as a solid lump or stock, it may be blown in as a powder with gas, or it may be washed in with a small stream of the well fluids or other liquid. Where there is gas pressure on the casing, it is necessary of course, to employ any of these treating methods through a pressure equalizing chamber equipped to allow introduction of reagent into the chamber, equalization of pressure between chamber and casing, and travel of reagent from chamber to well casing.

For injection into the well annulus, the corrosion inhibitor is usually employed as a solution in a suitable solvent. The selection of solvent will depend much upon the specific reagent being used and its solubility characteristics.

For example, for the protection of gas wells and gas-condensate wells, the amount of corrosion inhibitor used might range between about ¼ to 3 lbs per million cubic feet of gas produced, depending upon the amounts and composition of corrosive agents in the gas and the amount of liquid hydrocarbon and water produced. However, on no case does the amount of inhibitor required appear to be stoichiometrically related to the amount of acids produced by a well, since protection is obtained with much less corrosion inhibitor than usually would be required for neutralization of the acids produced.

These reagents can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processea re usually described as secondary recovery processes. One such process which is used quite frequently is the water flooding process wherein wter is pumped under pressure into what is called an "injection well" nd oil, along with quantities of water, that have been displaced from the formation, are pumped out of an adjacent well usually referred to as a "producing well". The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system". If the water is recirculated in a closed system without substantial aeration, the secondary recovery method is referred to herein as a "closed water flooding system".

Because of the corrosive nature of oil field brines, to economically produce oil by water flooding, it is necessary to prevent or reduce corrosion since corrosion increases the cost thereof by making it necessary to repair and replace such equipment at frequent intervals.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the waste produced salt water. In many instances therefore, the salt water is disposed of by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by water flooding.

The compounds of this invention can also be used in such water disposal wells thus providing a simple and economical method of solving the corrosion problems encountered in disposing of unwanted water.

Water flood and waste disposal operations are too well known to require further elaboration. In essence, the flooding operation is effected in the conventional manner except that the flooding medium contains a minor amount of these compounds, sufficient to prevent corrosion.

While the flooding medium employed in accordance with the present invention contains water or oil field brine and the compounds of this invention, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bactericides which prevent the formation from becoming plugged through bacterial growth, tracers, etc. Similarly, they may be employed in conjunction with any of the operating techniques commonly employed in water flooding and water disposal processes, for example five spot flooding, peripheral flooding, etc. and in conjunction with other secondary recovery methods.

The polymer which exhibits advantageous dual corrosion and gas hydrate inhibitory characteristics in the composition of the invention is a copolymer of about 70–97% by weight of vinyl caprolactam and 3–25% by weight of vinyl pyridine, preferably the 2- and 4-vinyl pyridine compounds, and, optionally, terpolymers with up to 15% by weight of vinyl pyrrolidone therein.

Preferably the vinyl caprolactam monomer comprises about 75–95% of the polymer and the vinyl pyridine monomer is present in an amount of about 5–15%; optionally, vinyl pyrrolidone is included therein in an amount of up to 10%.

The polymers of the invention also may be quaternized, suitably with about a $C_1$–$C_{18}$ alkyl halide; e.g. an alkyl iodide.

Preferably the polymer has a molecular weight of about 500 to 2500.

The composition herein is a single phase system having a cloud point of >10° C., preferably >15° C.

Preferably, the polymer is synthesized from its monomers in a polymerization solvent which preferably is a glycol ether containing an alkoxy group having at least 3 carbon atoms. Representative of such suitable glycol ethers are 2-butoxyethanol (ethylene glycol monobutyl ether); propylene glycol butyl ether, (diethylene glycol) monobutyl ether; and 2-isopropoxy-ethanol. 2-Butoxyethanol (BGE) is most preferred.

The product of the polymerization is a composition of the polymer in its polymerization solvent, e.g. BGE. Generally, the weight ratio of the polymerization solvent to the polymer is about 1:1.5 to 3:3 to 1, preferably about 1.5:1.

The composition is then provided with a suitable carrier solvent such as monoethylene glycol (MEG), methanol, ethanol, propanol, 1,4-butanediol, butanol, pentanol, hexanol, cyclohexyl pyrrolidone, propargyl alcohol, N-methylpyrrolidone and the like, preferably MEG. Suitably, the concentration of MEG in the aqueous phase, i.e. under pipeline inhibition conditions, is about 2.5–10 wt. %, preferably 4–5 wt. %.

The thus-formed solution with carrier solvent can be further diluted with a dilution liquid, preferably water or methanol, or mixtures thereof, if desired, to form a use composition for injection into the pipeline. Suitably, the inhibitor composition-to-dilution liquid ratio is about 0.5:1 to 5:1.

Generally, the polymer solution used in the composition of the invention is present in an amount of about 30 to 70%, preferably 45 to 55%, by weight in admixture with the polymerization solvent. The polymer inhibition concentration in the pipeline, i.e. in the aqueous phase (water being inherently present therein) is about 0.1 to 3%, preferably 0.5–1%, by weight. The solvent* inhibition concentration, accordingly, is about 1 to 9% by weight of the aqueous phase.

* total of all solvents present in the composition

A. Experimental Runs

Preparation of Inhibitor Compositions

Example 1 illustrates the preparation of a 40 weight % solution of a copolymer of 97% by weight vinyl caprolactam and 3% by weight of 4-vinyl pyridine in 2-butoxy-ethanol (BGE).

EXAMPLE 1

Preparation of Vinyl Caprolactam (VCL)/4-Vinylpyridine (4-Vpy) (97/3) Copolymer in 2-Butoxyethanol 300.00 g of 2-butoxyethanol (BGE) was charged into a 1-l, 4-necked resin kettle, fitted with a reflux condenser, a nitrogen inlet tube, a propeller agitator, a thermal watch/thermocouple and a heating mantle. Nitrogen sparging was started and continued throughout the experiment. The kettle was then heated to 150° C. and maintained at 150±2° C. throughout the experiment while keeping agitation speed at 250 rpm. A premix of 194.0 g of vinyl caprolactam, 6.0 g of 4-vinylpyridine and 4.0 g of di-t-butyl peroxide initiator (98.5% active) was prepared and pumped into the resin kettle over a period of 2 hours. After the completion of monomer feeding, the reaction mixture was held at 150° C. for 60 minutes. Thereafter, 0.5 g of di-t-butyl peroxide was added hourly, five times, to react out residual monomers. The reaction was then held at 150° C. for an additional 2 hours before cooling to ambient conditions. Vinyl caprolactam/4-vinylpyridine (87/3) copolymer thus obtained was 40% solids solution in 2-butoxyethanol (BGE). Gas chromatography (GC) analysis indicates that residual vinyl caprolactam and 4-vinylpyridine in the polymer are 0.86 and 0.05%, respectively. The polymer has a relative viscosity of 1.061 (1% in BGE, GPC weight-average molecular weight of 1,060, polyethylene glycol as standard).

Example 2 is representative of the effectiveness of the copolymer of the invention in corrosion inhibition of metals in natural gas pipelines.

EXAMPLE 2

The copolymer of Example 1 is diluted with monoethylene glycol and is used in gas hydrate inhibition in natural gas wells, whereupon dual functionality of gas hydrate inhibition and corrosion inhibition is demonstrated by its effectiveness in preventing corrosion in the pipeline.

While the invention has been described with particular reference to certain embodiments thereof, it will be understood that changes and modifications may be made which are within the skill of the art. Accordingly, it is intended to be bound only by the following claims, in which:

What is claimed is:

1. A process of inhibiting the corrosion of metals in a pipeline system wherein metals are affected by corrosion, which comprises introducing a copolymer of (a) vinyl caprolactam and (b) vinyl pyridine, optionally a terpolymer with (c) vinyl pyrrolidone, into the fluid phase of said pipeline system.

2. A process according to claim 1 wherein, by weight, (a) is 70–97%; (b) is 3–25%; and (c) is 0–15%.

3. A process according to claim 2 wherein (a) is 75–95%; (b) is 5–15%; and (c) is 0–10%.

4. A process according to claim 1 wherein (b) is quaternized.

5. A process according to claim 4 wherein the quaternization is carried out with a $C_1$–$C_{18}$ alkyl halide.

6. A process according to claim 5 wherein the halide is iodide.

7. A process according to claim 1 wherein (b) is a 2- or 4-vinyl pyridine.

8. A process according to claim 1 which has a cloud point of >10° C.

9. A process according to claim 1 which has a cloud point of >15° C.

10. A process according to claim 1 wherein the copolymer is polymerized in butoxyethanol and includes monoethylene glycol as carrier solvent.

11. A process according to claim 10 which is applied at a dose level of 0.3–1wt. %.

12. A process according to claim 1 wherein (b) is 4-vinyl pyridine quaternized with a $C_1$–$C_{18}$ alkyl halide.

13. A process according to claim 1 wherein (a) has a molecular weight of about 500 to 2500.

14. A process according to claim 1 wherein said metal is a steel pipeline containing natural gas and water.

* * * * *